Jan. 15, 1952   C. R. WILLIAMS ET AL   2,582,367
GLOW TUBE PULSE AMPLIFIER
Filed June 3, 1950

INVENTORS:
CHARLES R. WILLIAMS
GLENN E. HAGEN

BY Herbert E. Metcalf
THEIR PATENT ATTORNEY

Patented Jan. 15, 1952

2,582,367

UNITED STATES PATENT OFFICE 2,582,367

GLOW TUBE PULSE AMPLIFIER

Charles R. Williams, Hawthorne, and Glenn E. Hagen, Lawndale, Calif., assignors to Northrop Aircraft, Inc., Hawthorne, Calif., a corporation of California Application June 3, 1950, Serial No. 165,999

4 Claims. (Cl. 250—27)

1

The present invention relates to pulse amplifiers and more particularly to a cold cathode glow tube and circuit for amplifying pulses such as, for example, may be produced by a radiation counter tube exposed to gamma radiation.

An object of the invention is to produce a simple and effective pulse amplifier.

It is a well known property of gas and vapor tubes, in general, that very steep voltage wave fronts and high amplitude current pulses can be obtained from the firing of these tubes while under the stress of a suitable anode to cathode potential. Upon firing, the anode to cathode potential drops rapidly to the burning value characteristic of the tube and high energy pulses can be derived from the resultant discharge of capacitors connected across the tube. Usually, positive pulses are derived from the cathode and negative pulses are derived from the anode circuits of such tubes.

Briefly, the present invention includes the use of a cold cathode glow tube having an anode, a trigger electrode, and a cold cathode energized by a potential source sufficient to place the operating point of the tube on the characteristic voltage-current curve close to its unstable range. A stable glow is established on the cathode and a negative input pulse is applied to the trigger electrode, thereby causing the cathode glow to be interrupted, thus allowing the anode potential to rise. When the anode potential reaches the firing voltage of the tube, the glow is restruck on the cathode. Upon restriking, the sudden potential drop at the anode provides a source of negative pulses suitable for actuating a counter circuit, for example.

The invention is particularly suited to triggering by a high impedance pulse source. For example, with an input impedance of 10 megohms power gains up to 10,000 can be realized.

The invention will be more fully understood by reference to the following description of the drawings, in which.

2

Figure 6:
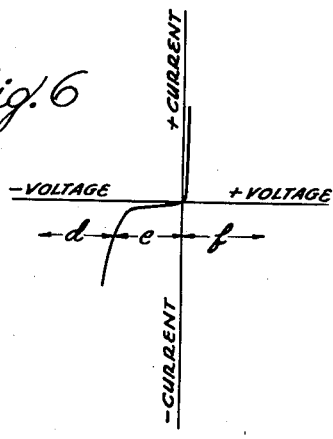
Figure 5:
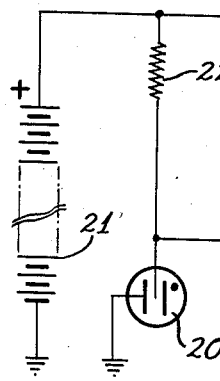
Figure 5 is a preferred form of pulse amplifier used in a radiation counter device.
Figure 5:
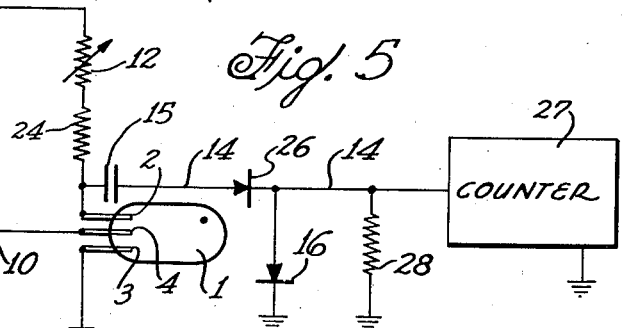

Figure 6 is a chart showing a typical voltage-current characteristic of a crystal diode such as is used in the circuit of Figure 5.

Figure 1:
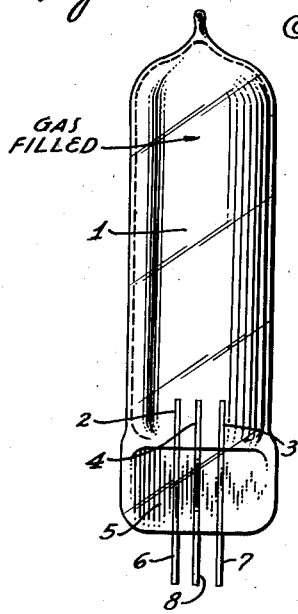
Figure 1 is a side view in elevation of one preferred form of cold cathode tube used in the circuit of the present invention.
Figure 2:
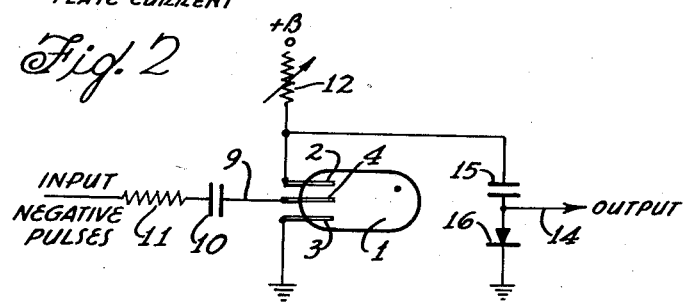
Figure 2 is a circuit diagram showing the tube of Figure 1 used as a pulse amplifier according to the present invention.

As shown in Figure 1, the tube preferred for use in the circuits of Figures 2 and 5 is provided with an envelope 1 containing an anode wire 2, a cathode wire 3 and a trigger electrode wire 4. These wires pass through an external pinch 5 to form an anode lead 6 and cathode lead 7, and trigger lead 8.

A preferred tube is one inch long by ¼ inch in diameter. The gas pressure in the tube, the gas mixture, and the anode to cathode spacing is adjusted to give a desirable firing to burning voltage differential. Electrode spacings of .060 inch in helium, mixed with 2% water vapor at 150 mm. Hg pressure, are satisfactory. Suitable steady state tube currents are 0.1 to 0.2 ma. Such a tube will provide a firing to burning differential of from 100 to 300 volts and output pulses of similar amplitude.

To accelerate deionization and to promote triggering sensitivity, we prefer that the tube have from one percent to five percent of a recombinable polyatomic gas therein, such as hydrogen or water vapor, for example, in addition to the inert gas filling, in accordance with the teachings of a copending Hagen application, Serial No. 100,178, filed June 6, 1949, now Patent No. 2,575,516 issued November 20, 1951. The anode, cathode and trigger electrodes may all be simple wires or rods, and it is preferred that the anode and the cathode be side wires, with the trigger electrode therebetween.

Referring next to Figure 2 the cathode 3 of tube 1 is grounded. The trigger electrode 4 is connected to a source of negative pulses through an input line 9 containing an input capacitor 10, the pulse source being preferably of high impedance as represented by input resistor 11. If the pulse source is of low impedance, a suitable crystal diode or an oscillation damping resistor, for example, one megohm, may be inserted in the input to promote stability.

Anode 2 is connected through a variable anode resistance 12 to the positive end B+ of a potential source, and is also connected through a capacitor 15 to an output line 14 which is ground through a shunt rectifying diode 16.

Figure 3:
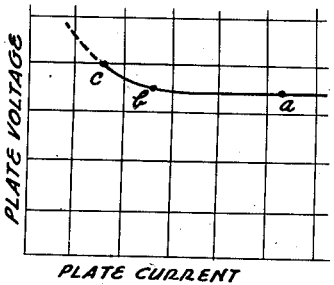
Figure 3 is a chart showing a typical voltage-current characteristic for a tube such as shown in Figure 1.

The voltage B+ at the anode 2 is made to be sufficient to cause tube 1 to strike quickly to the cathode 3. The current used by the anode 2 is adjusted by variation of the anode resistor 12 to operate at a desirable point on the voltage-current curve as typically shown in Figure 3. At point $a$ on this curve, i. e., on the zero slope portion thereof, the tube is stable. At point $c$ on the negative slope, the tube is unstable and will oscillate. A point such as $b$ can be chosen where the tube is still stable but is highly sensitive to triggering. When at such a point, the glow discharge at the cathode 3 can be interrupted by the field produced by a relatively small negative voltage pulse on the adjacent trigger electrode 4.

Figure 4:
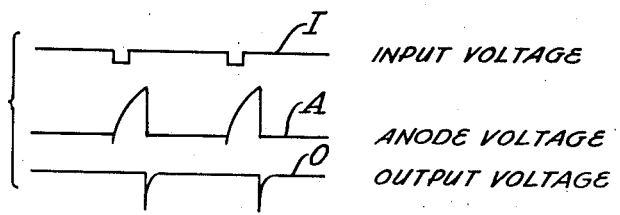
Figure 4 is a diagram of the input and output pulse relationship in the circuit of Figure 3.

After cathode current interruption by a negative input pulse, the anode potential rises, charging capacitor 15 toward the potential of B+; and when the firing point is reached, the tube automatically restrikes to the cathode 3, permitting capacitor 15 to discharge and thereby providing a negative pulse in the output circuit 14. The relation between input, anode and output voltage waveforms is shown in Figure 4; the input pulse voltage curve being there designated as curve I, anode voltage curve labelled curve A, and the output pulse voltage curve labelled curve O. When the tube reignites, the anode voltage drops sharply and a negative output pulse is developed across diode 16 by the discharge of capacitor 15 through the tube. Capacitor 15 and rectifier diode 16 also act as an anode load to slow the rate of anode voltage rise after triggering, thereby somewhat improving the sensitivity of the circuit. As is shown in Figure 4, there is a time delay between the input pulses I and the output pulses O. This delay is proportional to and may be controlled by the size of capacitor 15. Hence, in addition to amplifying, the invention may be used as a delay device.

The tube and circuit of Figure 2 is ideally suited for use as a pulse amplifier between a radiation counter tube, such as a Geiger-Müller tube, and a pulse counter, as shown in Figure 5. A radiation counter tube 20 is connected to the trigger electrode 4 of tube 1 through input capacitor 10 and to voltage source 21 through radiation tube resistor 22. The anode 2 of tube 1 is connected to source 21 through a fixed anode resistance 24 and the variable anode resistance 12, which permits adjustment of the anode voltage to operate the tube at or near point $b$ on the curve of Figure 3.

The output line 14 contains a series output capacitor 15, and the shunt rectifying diode 16, as in the circuit of Figure 2, but contains in addition a second rectifying diode 26 in series with the output. This latter rectifier 26 acts as a buffer to prevent reflection of pulses back through the output line 14 to the tube 1 that might cause oscillation thereof.

The output line is then connected to a counter 27 past a shunt load resistor 28. Counter 27 may be, for example, a ten stage gas tube binary counter such as has been shown, described and claimed in our copending application, Serial No. 167,572, filed June 12, 1950. Load resistor 28 reduces stray pickup on output line 14 that might trigger counter 27.

The tube 1 is susceptible to triggering by pulses coupled back to the anode 2, such as from a gas tube radiation counter, for example. Figure 6 shows the current-voltage characteristic of diode 26 which preferably is of the germanium crystal type and which has two voltage ranges $d$ and $f$ of conductivity separated by an intermediate range $e$ of high resistivity. When the tube 1 is triggered, diode 26 is in range $f$ where it is highly conductive and does not interfere with the charging of capacitor 15 or with the triggering action. When the anode 2 restrikes, the discharging of capacitor 15 forces diode 26 through the high resistance range $e$ into conducting range $d$ which permits a somewhat diminished pulse to be passed out to the load 27. After the output pulse has expired, diode 26 falls back into range $e$ through which it progresses relatively slowly as capacitor 15 is discharging through the now high resistance of diode 26. This momentary blocking by diode 26 prevents immediate reaction of the counter 27 from reaching the anode 2.

Specific component values for one particular circuit, as shown in Figure 5, found satisfactory for amplifying radiation counter tube pulses are given below:

| | | |
|---|---|---|
| Potential of source 21 | volts | 900–950 |
| Radiation counter tube resistance 22 | megohms | 2 |
| Input capacitor 10 | mmf | 100 |
| Fixed anode resistor 24 | megohms | 2 |
| Variable anode resistance 12 | do | 2–4 |
| Output capacitor 15 | mmf | 100 |
| Load resistor 28 | ohms | 100,000 |

Rectifiers 16 and 26 are germanium crystal diodes.

Maximum pulse amplifying rate is 1000 counts per sec.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute, the invention has been described in language more or less specific as to structural features, it is to be understood that the invention is not limited to the specific features shown, but that the means and construction herein disclosed comprise a preferred form of putting the invention into effect, and the invention is, therefore, claimed in any of its forms or modifications within the legitimate and valid scope of the appended claims.

What is claimed is:

1. A pulse amplifier comprising a tube having an envelope containing an anode, a cold cathode, a cold trigger electrode and a filling of ionizable gas at glow discharge pressure providing a negative voltage-current curve slope, a source of potential greater than the firing voltage of said tube, connected across said anode and said cathode, resistance means in series with said source and said anode to adjust said tube to glow stably between said anode and said cathode close to an unstable condition on the negative slope of said curve, input means for applying a negative pulse to said trigger electrode to extinguish said glow, said glow being re-established automatically due to voltage rise through said resistance means, a capacitor and diode series combination connected in shunt across said anode and said cathode providing a means of storage of energy from said source during extinction time of said glow, and an output line connected across said diode and said cathode to emit a negative pulse generated by said glow re-establishment.

2. A pulse amplifier comprising a tube having an envelope containing an anode, a cold trigger electrode, a cold control cathode and a filling of ionizable gas at glow discharge pressure providing a negative voltage-current curve slope, a source of potential greater than the firing voltage of said tube, connected across said anode and said working cathode, resistance means in series with said source and said anode to adjust said tube to glow stably between said anode and said cathode close to an unstable condition on the negative slope of said curve, input means for applying a negative pulse to said trigger electrode to extinguish said glow, said glow being re-established automatically due to voltage rise through said resistance means, and an output line connected across said anode and said cathode to receive a positive pulse generated by said glow interruption, and means in said output line for inverting said positive pulse to a negative output pulse, said latter means including a capacity in series with a rectifying diode across said anode and cathode.

3. A pulse amplifier in accordance with claim 1 wherein a radiation counter tube forms a part of said input means and wherein a multi-stage pulse counter is connected to said output line through a rectifying diode oriented to prevent reflection of energy toward said tube.

4. A pulse amplifier in accordance with claim 1 wherein a radiation counter tube forms a part of said input means and wherein a multi-stage pulse counter is connected to said output line through a rectifying diode oriented to prevent reflection of energy toward said tube, and a shunt resistor across the input of said counter.

CHARLES R. WILLIAMS.
GLENN E. HAGEN.

REFERENCES CITED

The following references are of record in the file of this patent:

UNITED STATES PATENTS

| Number | Name | Date |
| --- | --- | --- |
| 1,950,003 | Hund | Mar. 6, 1934 |
| 1,951,416 | Hund | Mar. 20, 1934 |